United States Patent [19]
Evans

[11] 3,991,294
[45] Nov. 9, 1976

[54] APPARATUS FOR MAKING LONGITUDINALLY PARTITIONED TUBULAR BODIES AND CONTAINER ASSEMBLIES

[75] Inventor: Stephen F. Evans, Forest Park, Ohio

[73] Assignee: The Procter & Gamble Company, Cincinnati, Ohio

[22] Filed: Oct. 30, 1975

[21] Appl. No.: 627,440

Related U.S. Application Data

[62] Division of Ser. No. 415,483, Nov. 13, 1973, Pat. No. 3,948,704.

[52] U.S. Cl............................ 219/10.49; 219/10.53; 219/10.79
[51] Int. Cl.² ...................... H05B 5/08; B23K 13/02
[58] Field of Search........... 219/10.53, 10.79, 10.57, 219/10.67, 10.49, 10.73; 156/218, 216, 69, 272, 446, 184; 222/94; 220/20, 16, 22; 93/81; 229/15

[56] References Cited
UNITED STATES PATENTS

| | | | |
|---|---|---|---|
| 2,764,660 | 9/1956 | Grenoble | 219/10.79 X |
| 3,081,926 | 3/1963 | Newton | 229/5.6 |
| 3,227,319 | 1/1966 | Rosien | 222/94 |
| 3,290,422 | 12/1966 | Michel | 264/259 |
| 3,727,022 | 4/1973 | Hamilton | 219/10.53 X |

Primary Examiner—Bruce A. Reynolds
Attorney, Agent, or Firm—Thomas J. Slone; John V. Gorman; Richard C. Witte

[57] ABSTRACT

An apparatus for making a longitudinally partitioned tubular body and sealingly securing a longitudinally divided head fitment to one end of the body to form a collapsible, longitudinally partitioned tubular dispensing container assembly. A single sheet of body forming material is configured, looped, spindled, and seamed to integrally form a tubular exterior wall and a chordal partition which are sealingly secured together along two longitudinally extending lap seams in the tubular wall. An end of the tubular wall is sealingly secured to the radially outwardly facing cylindrical surface of a longitudinally extending cylindrical skirt portion of the head fitment, and the adjacent end portion of the chordal partition is sealingly secured to a longitudinally extending chordal divider portion of the head fitment.

1 Claim, 45 Drawing Figures

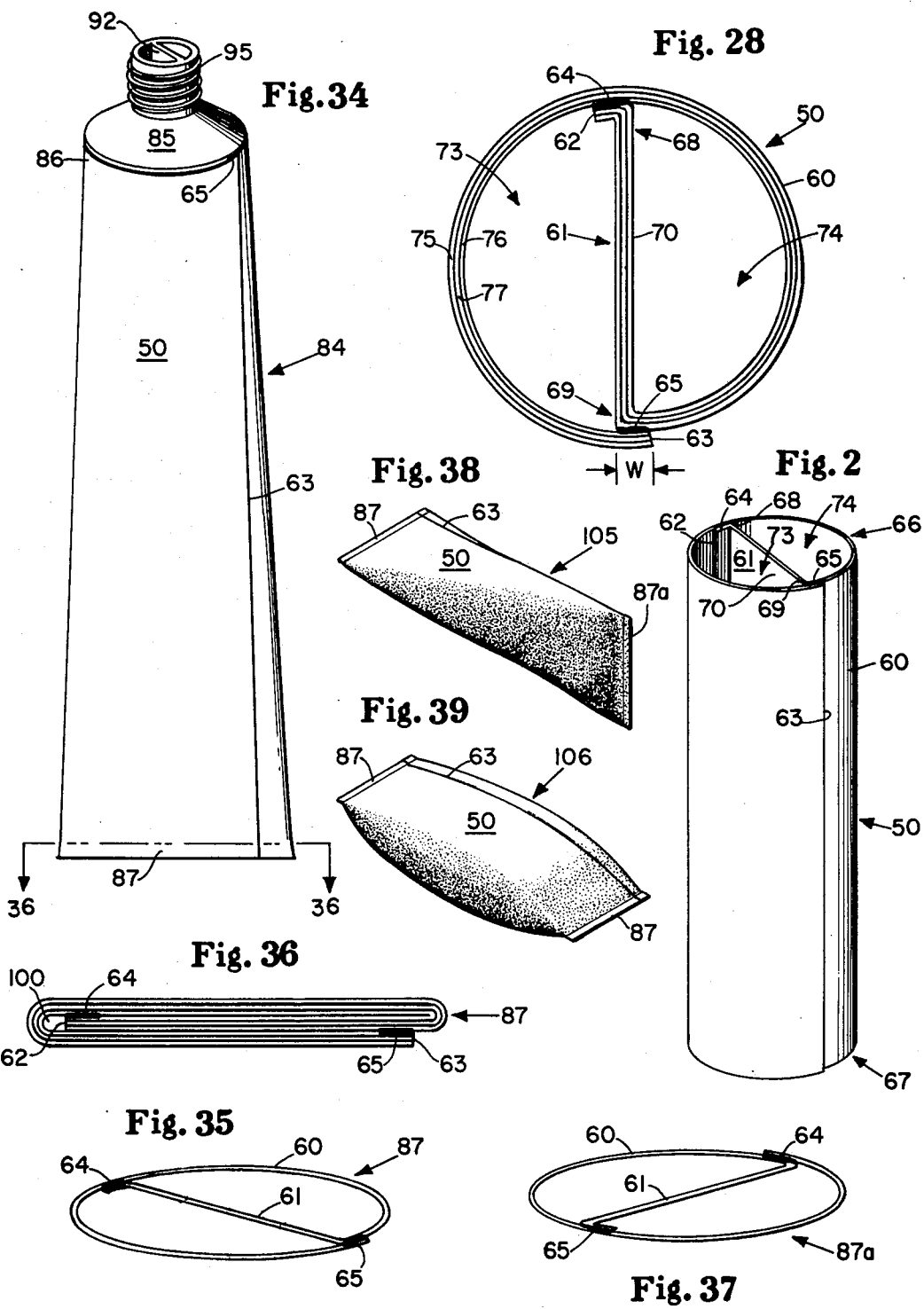

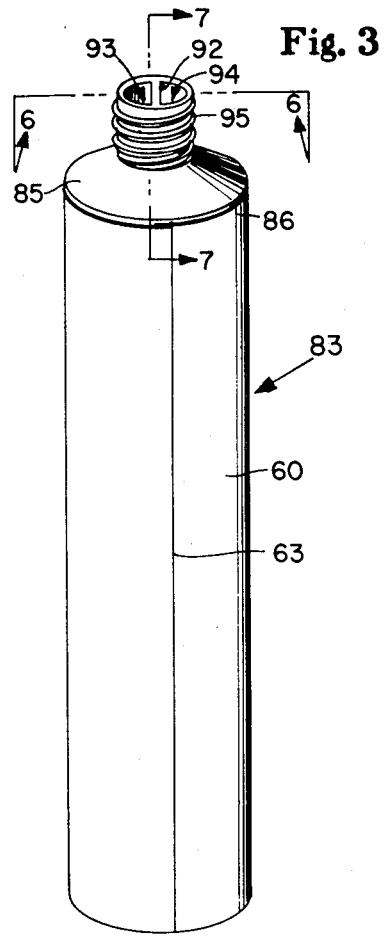
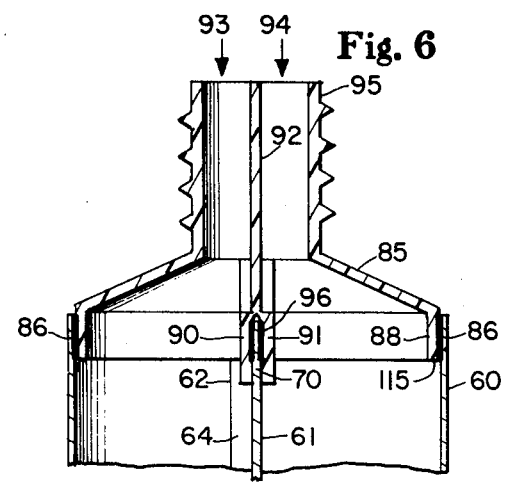
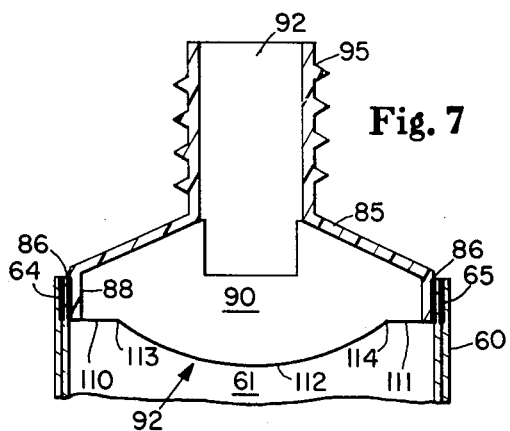
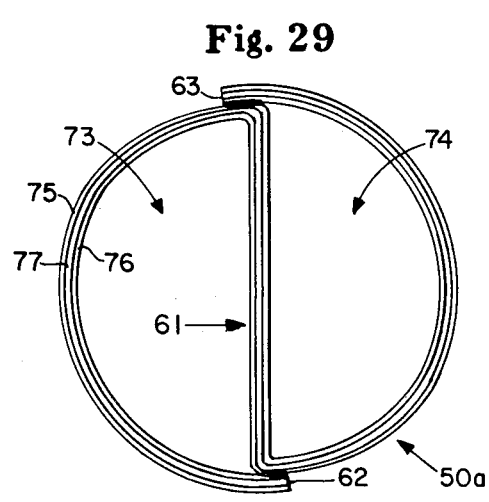
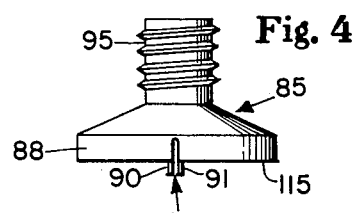
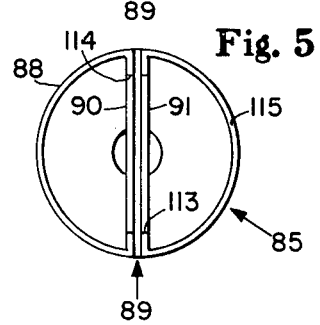

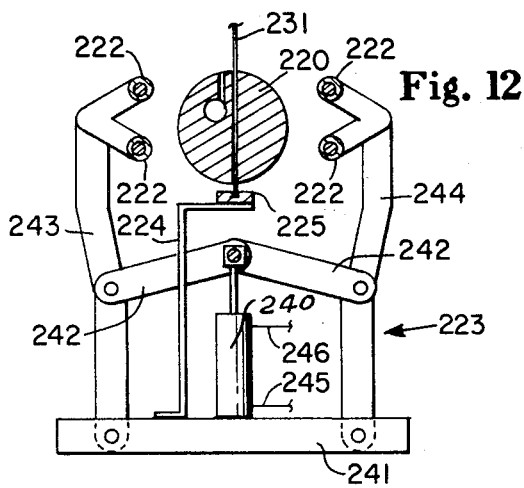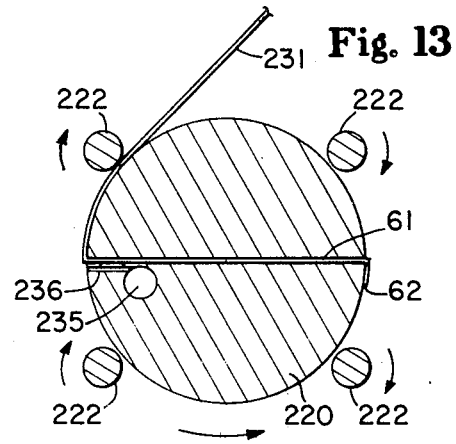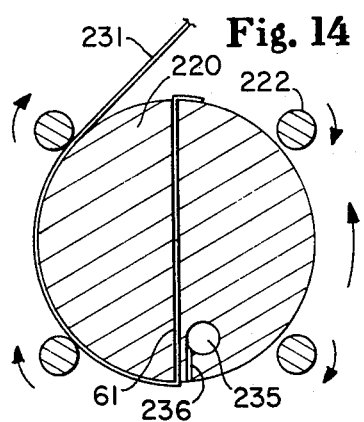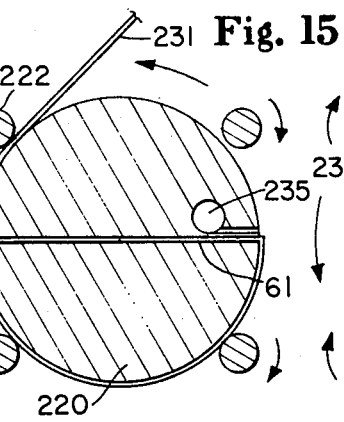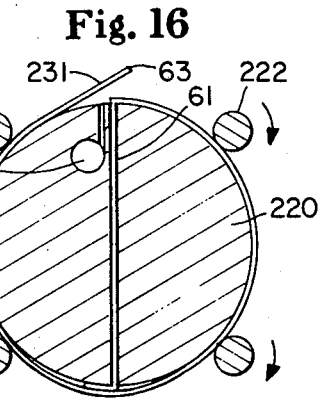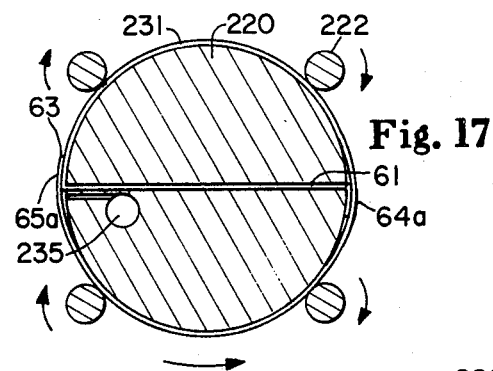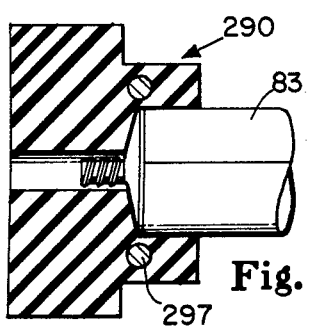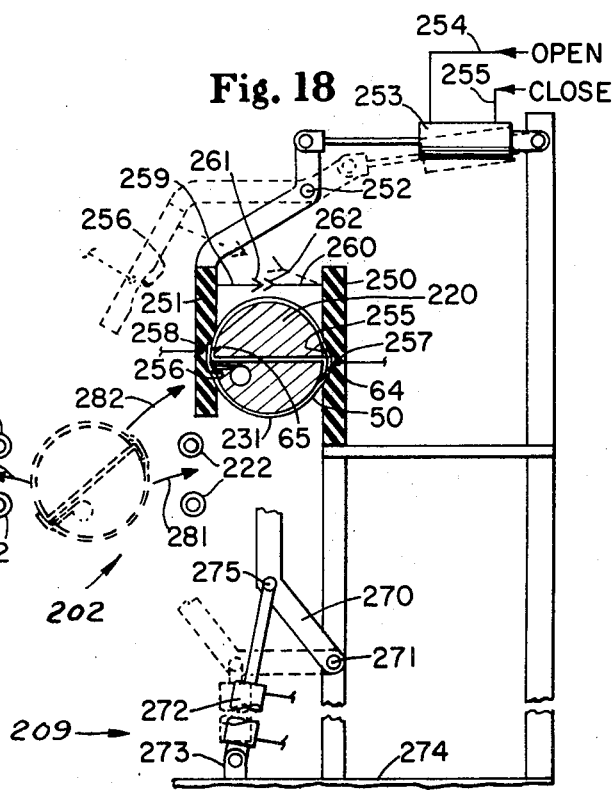

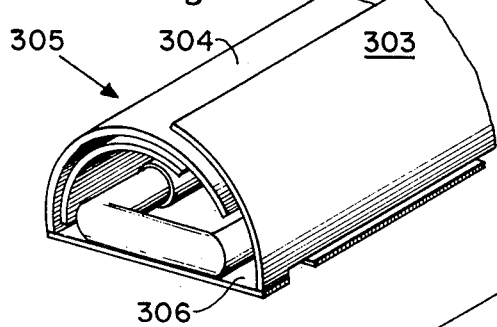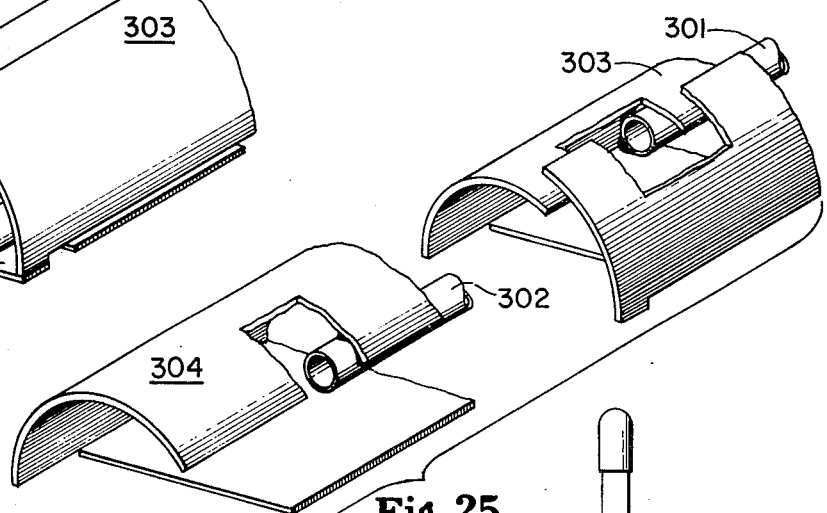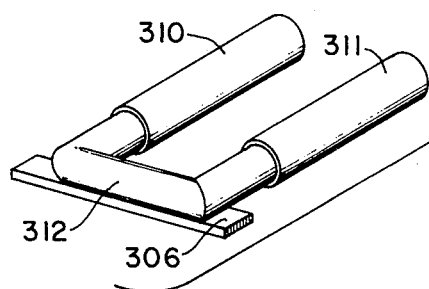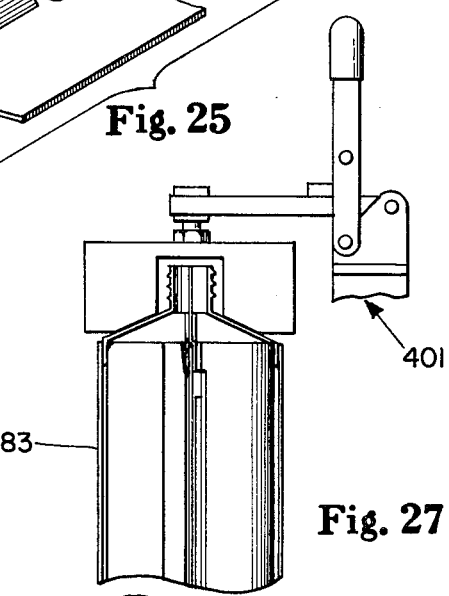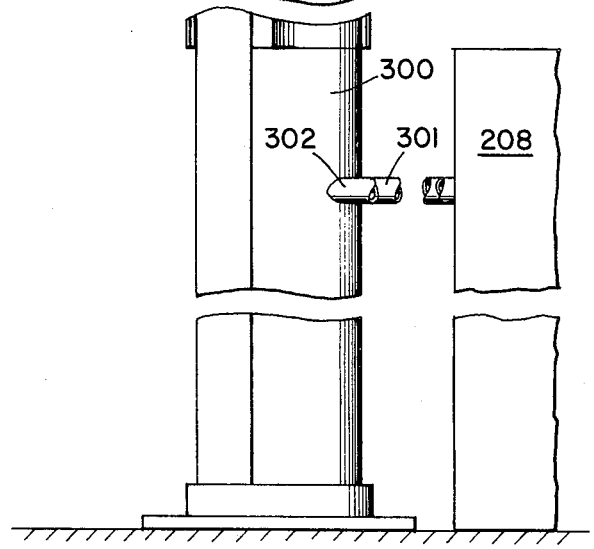

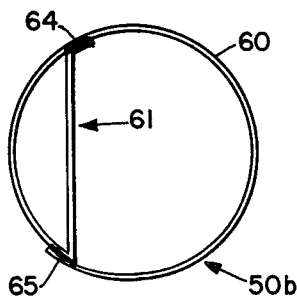
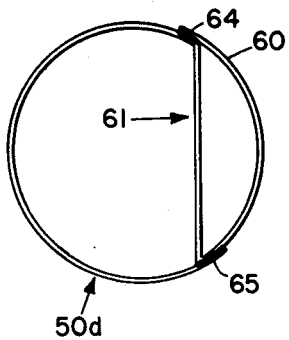
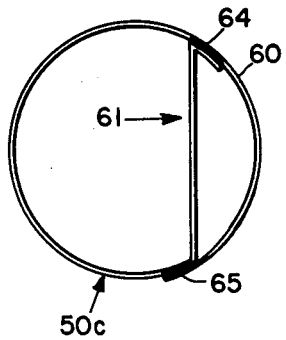
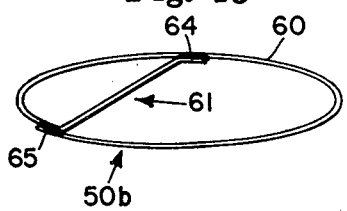
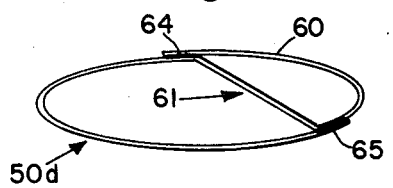
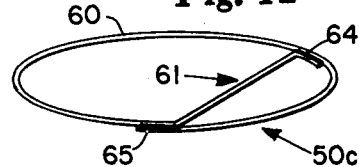
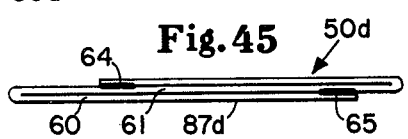
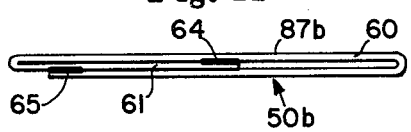
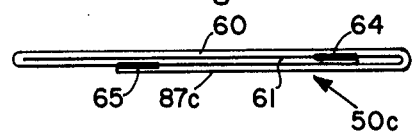
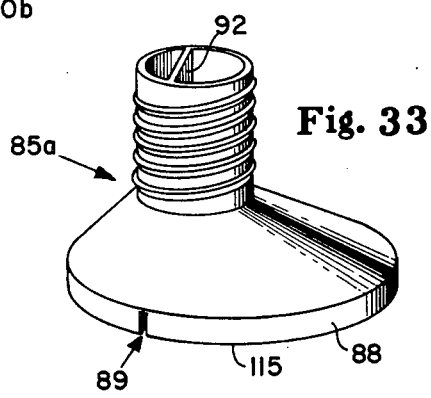

APPARATUS FOR MAKING LONGITUDINALLY PARTITIONED TUBULAR BODIES AND CONTAINER ASSEMBLIES

This is a division, of application Ser. No. 415,483, filed Nov. 13, 1973 now U.S. Pat. No. 3,948,704.

CROSS REFERENCES TO RELATED APPLICATIONS

This application is related to the commonly assigned, concurrently filed application of Charles R. Hood entitled LONGITUDINALLY PARTITIONED TUBULAR BODY, and the application of Charles R. Hood and Stephen F. Evans entitled COLLAPSIBLE LONGITUDINALLY PARTITIONED TUBULAR DISPENSING CONTAINER which were both filed Nov. 13, 1973, and have been assigned Ser. No. 415,467, and Ser. No. 415,468, respectively. Application Ser. No. 415,467 has been abandoned in favor of application Ser. No. 586,103 and 415,468 has been abandoned in favor of 601,688.

FIELD OF THE INVENTION

This invention relates to making longitudinally partitioned tubular bodies and container assemblies for packaging and co-dispensing two-component products wherein the components must be isolated from each other until dispensed, and which components are to be dispensed in predetermined proportions.

BACKGROUND OF THE INVENTION

Generally, products comprising plural flowable components which require isolation during storage have such a requirement because of chemical reactions which occur upon mixing the components. A familiar example of such a two-component product which must have its components isolated from each other during storage is epoxy adhesive comprising resin and hardener components. The resin and hardener components must be stored independently because, upon being mixed, a chemical reaction occurs which causes hardening or setting of the adhesive. Successive batches of resin and hardener are desirably dispensed and mixed in predetermined proportions.

Various aspects of making longitudinally partitioned tubular bodies, collapsible tubes, and collapsible, longitudinally partitioned containers are disclosed in the prior art. Longitudinally partitioned tubes or containers are disclosed in French Pat. No. 961,154, published May 8, 1950, titled "Improvement in Tubes for Ointments or the Like", German Pat. No. 580,134, filed July 17, 1931, and U.S. Pat. No. 3,290,422, issued Dec. 6, 1966 to Kenneth George Michel. U.S. Pat. No. 3,307,738, issued Mar. 7, 1967 to Christian Theodore Scheindel, discloses a laminated collapsible tube. U.S. Pat. No. 3,117,214, issued Jan. 7, 1964 to Vance Burton Gold, discloses a method of and apparatus for making a tubular body of a sheet of material by spindling it and welding it along a longitudinally extending lap seam. U.S. Pat. No. 3,567,546, issued Mar. 2, 1971, to Cecil Edward Morris et al., and U.S. Pat. No. 3,727,022, issued Apr. 10, 1973 to Peter W. Hamilton disclose various aspects of using induction heating means to make collapsible tubular containers including thermo welding a thermoplastic, injection molded head fitment to a tubular body. U.S. Pat. No. 3,468,731, issued Sept. 23, 1969, to Edward G. Obeda, and U.S. Pat. No. 3,424,885, issued Jan. 28, 1969 to Carl Garney et al. disclose a method of and means for transversely sealing end portions of thermoplastic tubular containers. None of the referenced prior art has, however, solved all of the problems associated with providing longitudinally partitioned tubular bodies in the manner of nor to the degree of the present invention.

SUMMARY OF THE PRESENT INVENTION

The nature and substance of the instant invention will be more readily appreciated after giving consideration to its major aims and purposes. The principal objects of the invention are recited in the ensuing paragraphs in order to provide a better appreciation of its important aspects prior to describing the details of a preferred embodiment and other embodiments in later portions of this description.

A major object of the present invention is providing a method of making a tubular body having an integral chordal partition which divides the tubular body into two longitudinally extending tubular spaces disposed in back-to-back relation, which body is formed from a single sheet of material.

Another object of the invention is providing a method of making a collapsible, longitudinally partitioned tubular dispensing container assembly which can be sealed to provide two longitudinally extending compartments within it for separately storing the components of a two-component product and for simultaneously codispensing the components in predetermined proportions.

Still another object of the invention is providing an apparatus for making a tubular body having an integral chordal partition which divides the tubular body into two longitudinally extending tubular spaces disposed in back-to-back relation which body is formed from a single sheet of material.

Yet still another object of the present invention is providing an apparatus for making a collapsible, longitudinally partitoned tubular dispensing container assembly comprising a longitudinally partitioned tubular body and a longitudinally divided head fitment so that the container assembly can be sealed to provide two longitudinally extending compartments within it for separately storing the components of a two-component product and for simultaneously co-dispensing the components in predetermined proportions.

These and other objects of the present invention are achieved by providing a method of and apparatus for making a longitudinally partitioned tubular body from a single sheet of heat sealable material by looping and spindling a sheet of material to integrally form a tubular exterior wall and a chordal partition so that there is a circumferentially overlapped longitudinally extending seam forming area of said material adjacent each longitudinally extending side edge of the partition, and, by compressing, heating and cooling the seam forming areas to form two longitudinally extending heat-sealed seams. The apparatus for making a longitudinally partitioned tubular body from a single sheet of heat-sealable material comprises: a bifurcated mandrel, gauging means, a plurality of idler rolls circumferentially spaced about the mandrel, means for rotating the mandrel relative to the idler rolls, means for biasing the idler rolls against the mandrel and for spacing them from the mandrel, means for compressing and welding the longitudinally extending seams, and means for indexing the mandrel with the seam welding means. The method of making a collapsible, longitudinally partitioned tubular dispensing container comprising a longitudinally partitioned tubular body and a longitudinally divided head fitment comprises the steps of: telescoping the head fitment axially with respect to an end of the body so that a cylindrical skirt portion of the head fitment is inside the end of the tubular wall of the body, and so that the adjacent end portion of the partition of the body is disposed adjacent a chordal lower edge portion of the divider of the head fitment and extends radially through oppositely disposed slots in the cylindrical skirt; welding the skirt of the head fitment to the adjacent portion of the tubular exterior wall of the body; and compressing, heating, and cooling the adjacent portions of the skirt and divider of the head fitment and the partition of the body to form a chordal seam. A bifurcated induction heating inductor is provided for effecting the compressing, heating and cooling required to form the chordal seam between the head fitment and the partition of the body.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 2 is a perspective view of a longitudinally partitioned tubular body having an integral chordal partition which body is formed from a single sheet of material.

FIG. 3 is a perspective view of a collapsible, longitudinally partitioned tubular dispensing container assembly comprising a longitudinally partitioned tubular body as shown in FIG. 2 which is sealingly secured to a longitudinally divided head fitment.

FIGS. 4 and 5 are side elevational and bottom views, respectively, of the longitudinally divided head fitment which is shown assembled to a tubular body in FIG. 3.

FIGS. 6 and 7 are fragmentary sectional views taken along lines 6—6 and 7—7 respectively of FIG. 3.

FIGS. 12 through 17 are fragmentary, transverse cross-sectional views of the portion of the apparatus of FIG. 1 comprising means for looping and spindling a sheet of material through and about a bifurcated mandrel having four idler rolls circumferentially spaced about it by rotating the bifurcated mandrel with respect to the idler rolls.

FIG. 18 is a fragmentary, partially schematic, cross-sectional view of a portion of the apparatus of FIG. 1 comprising means for swinging the tube forming mandrel from a tube forming position to a position for welding the longitudinally extending seams of the tubular body.

FIG. 19 is a fragmentary cross-sectional view of the portion of the apparatus of FIG. 1 comprising means for welding a cylindrical skirt portion of an end fitment into an end of a tubular exterior wall of a tubular body.

FIG. 25 is an exploded, fragmentary, perspective view of the elements of the distal end of the induction heating bifurcation of the chordal seam inductor of FIG. 20.

FIG. 26 is a fragmentary perspective view of the chordal seam inductor elements shown in FIG. 25 which elements have been telescoped together in their assembled relation.

FIG. 27 is a fragmentary, partially schematic side elevational view of means for induction heat welding the partition of a tubular body to the divider of a longitudinally divided head fitment.

FIG. 28 is an enlarged scale, end view of the longitudinally partitioned tubular body shown in FIG. 2 which body is formed from a single sheet of laminated material having one inner lamina and two outer laminae.

FIG. 29 is an enlarged scale, end view of an alternate embodiment of a longitudinally partitioned tubular body having an integral diametral partition wherein neither longitudinally extending edge of the sheet of material from which the body is formed is disposed inside the tubular body.

FIGS. 30 through 32 are end views of alternate embodiments of longitudinally partitioned tubular bodies having asymmetrically disposed chordal partitions.

FIG. 33 is a perspective view of an asymmetrical, longitudinally divided head fitment which is compatible with the alternate tubular body configurations of FIGS. 30 through 32, FIG. 34 is a perspective view of a collapsible, longitudinally partitioned tubular dispensing container comprising the container assembly of FIG. 3 wherein the end of the tubular body disposed opposite from the end to which the head fitment is secured is collapsed and sealed to form an unpleated, transverse end seam consisting of no more than three layers of the sheet of material from which the body of the container is formed.

FIG. 35 is a cross-sectional view of the bottom end of the container of FIG. 34 showing it in a partially collapsed state.

FIG. 36 is a cross-sectional view of the transverse end seam of the container of FIG. 34 taken along line 36—36 thereof.

FIG. 37 is an end view of an alternate manner of collapsing an end of the tubular body shown in FIG. 2 to form a transverse end seam on the body.

FIG. 38 is a perspective view of a two-compartment, tetrahedral-shape package comprising a tubular body as shown in FIG. 2 having one end collapsed and transversely seamed as shown in FIGS. 35 and 36, and the other end transversely seamed after collapsing it in the manner indicated in FIG. 37.

FIG. 39 is a perspective view of a two-compartment package comprising a tubular body as shown in FIG. 2 having both ends collapsed and transversely seamed so that the seams are substantially co-planar.

FIGS. 40 and 41 are views of the alternate tubular body configuration of FIG. 30 showing an end thereof in a partially collapsed state and in a fully collapsed, unpleated state, respectively.

FIGS. 42 and 43 are views of the alternate tubular body configuration of FIG. 31 showing an end thereof in a partially collapsed state and a fully collapsed, unpleated state, respectively.

FIGS. 44 and 45 are views of the alternate tubular body configuration of FIG. 32 showing an end thereof in a partially collapsed state and in a fully collapsed, unpleated state, respectively.

DESCRIPTION OF THE PREFERRED EMBODIMENT

Figure 1:
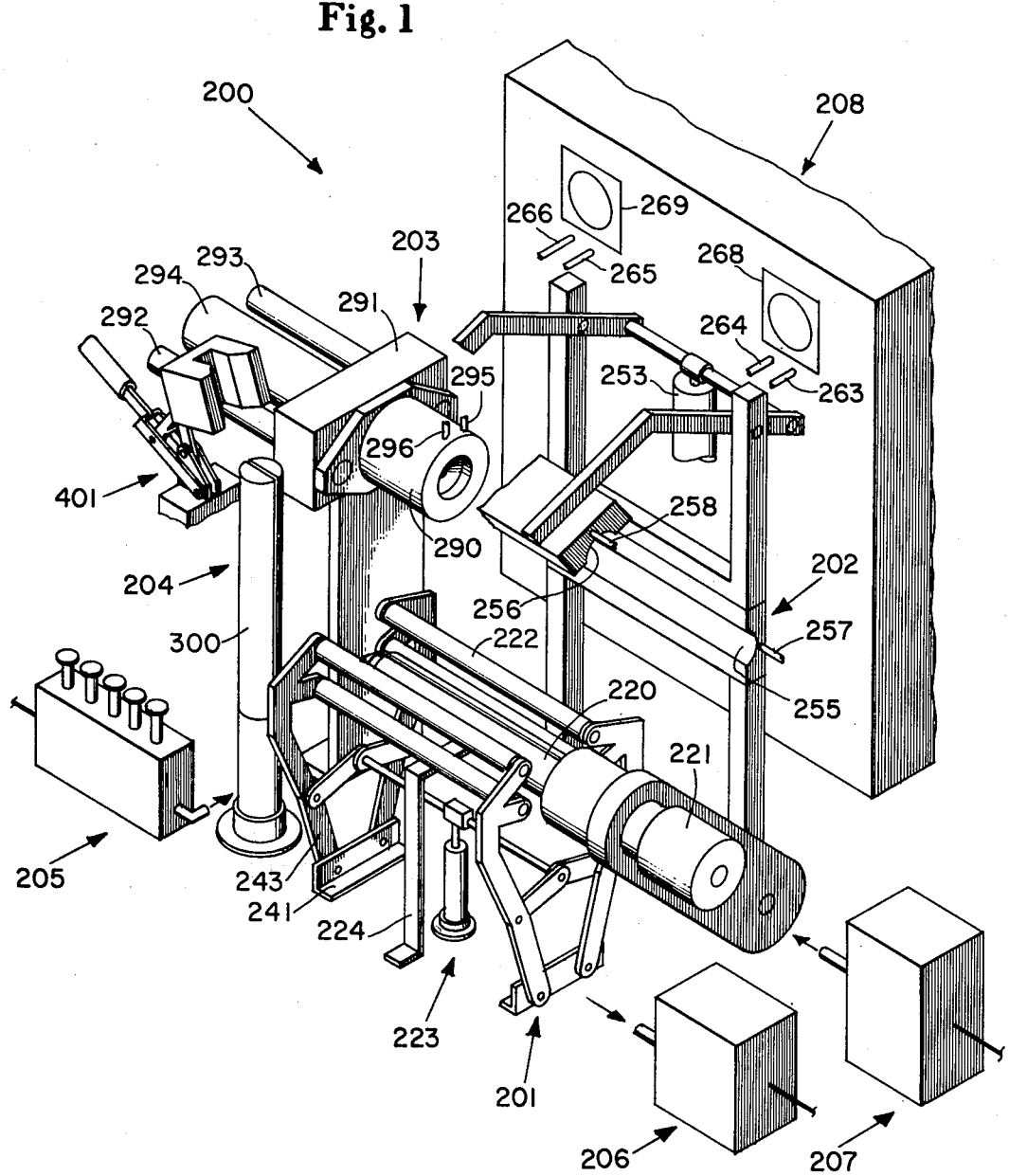
FIG. 1 is a fragmentary, partially schematic, perspective view of a preferred embodiment apparatus for making longitudinally partitioned tubular bodies of single sheets of material and for sealingly securing longitudinally divided head fitments to the tubular bodies.

Apparatus 200, FIG. 1, is a preferred apparatus embodiment of the present invention which enables making longitudinally divided tubular bodies from a single sheet of material and for sealingly securing tubular bodies to longitudinally divided head fitments to form collapsible containers in accordance with the methods of the present invention.

Apparatus 200 comprises tubular body forming means 201, means 202 for welding longitudinally extending, circumferentially overlapped seams of tubular bodies, circumferential seam welding means 203, diametral or chordal seam welding means 204, control means 205, vacuum means 206, and compressed air means 207. The inductors are powered by RF energy means 208. Mandrel translation means 209 is also provided for moving the mandrel 220 between the tube forming position shown in FIG. 1 and a second position adjacent the longitudinal seaming means 202, FIG. 18.

Apparatus 200 is described hereinafter through the use of descriptions of tubular body 50, FIG. 2, and container assembly 83, FIG. 3, which are fully disclosed in the commonly assigned, concurrently filed applications entitled LONGITUDINALLY PARTITIONED TUBULAR BODY of Charles R. Hood, and COLLAPSIBLE LONGITUDINALLY PARTITIONED TUBULAR DISPENSING CONTAINER of Charles R. Hood and Stephen F. Evans which applications were filed Nov. 13, 1973, and are identified by Ser. Nos. 415,467 and 415,468, respectively. It is not intended, however, to limit the present invention through the use of descriptions or features of body 50 and container assembly 83.

Briefly, however, apparatus 200 may be used to make a longitudinally partitioned tubular body 50, FIG. 2, from a single sheet of body forming material by looping and spindling the sheet through and about a bifurcated mandrel of tube forming means 201 and by then welding two longitudinally extending lap seams 64, 65 through the use of longitudinal seaming means 202. Also, apparatus 200 may be used to form a container assembly 83, FIG. 3, by looping and spindling a sheet of body forming material, as shown in FIGS. 8 through 17, through and about a bifurcated mandrel having a head fitment 85, FIGS. 4, 5, placed over the distal ends of the bifurcations of the mandrel. Then, the tubular body is longitudinally seamed by longitudinal seaming means 202, FIG. 18. After longitudinally seaming the body 50, a cylindrical skirt portion 88 of head fitment 85 is welded within an end of the tubular body by circumferential seaming means 203, and the top edge portion 70 of the partition 61 of the tubular body 50 is welded to the bottom edge portion of a longitudinally extending divider 92 of head fitment 85 through the use of diametral or chordal seaming means 204. The circumferential seam is designated 86, FIGS. 6, 7, and the chordal seam is designated 96, FIG. 6. Because the preferred embodiment container assembly 83, FIG. 1, is formed from laminated material comprising polyethylene outer laminae and an aluminum foil inner lamina, the material is susceptible to be inductively heated. Therefore, seaming means 202, 203 and 204 of the preferred embodiment of apparatus 200 comprise induction heating inductors which, when excited by RF energy means 208, induction weld all of the seams of container assembly 83.

TUBE FORMING MEANS

Tube forming means 202, FIG. 1, comprises mandrel 220, means 221 for rotating and angularly indexing mandrel 220 with four idler rolls 222 which are circumferentially spaced about mandrel 220, means 223 for biasing idler rolls 222 against mandrel 220 and for displacing the idler rolls from adjacent mandrel 220, and gauging means 224.

Figure 8:
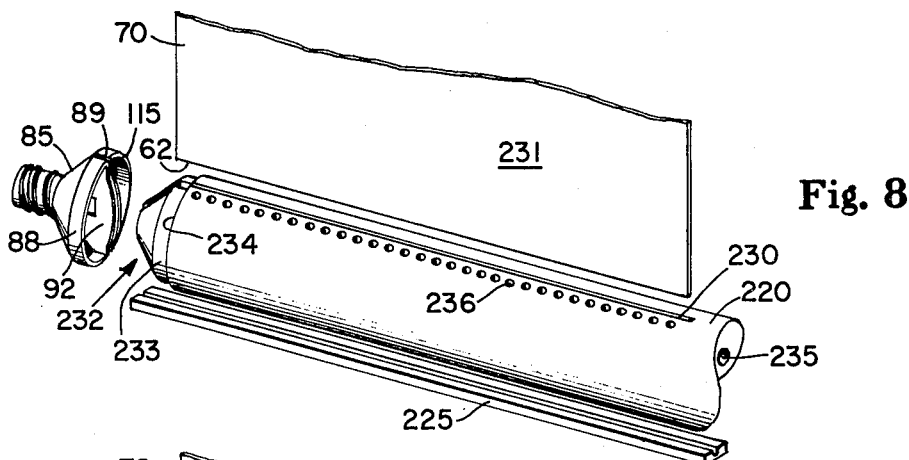
FIGS. 8 through 11 are fragmentary perspective views of the portion of the apparatus of FIG. 1 showing the sequence of looping and spindling a sheet of material through and about a bifurcated mandrel and about a cylindrical skirt portion of a longitudinally divided head fitment to form a tubular body having an integral longitudinally extending chordal partition which body can then be longitudinally seamed and then sealingly secured to the head fitment.

Mandrel 220, FIG. 8, has a cylindrical shape which is bifuracted by slot 230. Slot 230 extends transversely through mandrel 220 in a diametral plane. Slot 230 is of a width sufficient to permit telescoping a sheet 231 of body forming material completely through it. The distal end 232 of mandrel 220 comprises a cylindrical portion 233 of reduced diameter which is sized to have a cylindrical skirt portion 88 of head fitment 85 snugly telescoped over it to abut shoulder 234, FIG. 9. The portion of slot 230 through the distal end of mandrel 220 is widened sufficiently to have the bottom edge portion of divider 92 of head fitment 85 telescoped thereinto. Thus, when head fitment 85 is telescoped onto mandrel 220, FIG. 9, chordal channel 89 in the bottom edge portion of divider 92 of head fitment 85 is aligned with slot 230 in mandrel 220. Mandrel 220 is also provided with a longitudinally extending passageway 235 and a longitudinally extending row of radially extending passageways 236 disposed adjacent slot 230. Each of the radial passageways 236 communicates with longitudinally extending passageway 235 for a purpose to be disclosed hereafter. Mandrel 220 of the preferred embodiment apparatus 200 is made from insulation material having a low susceptibility to induction heating so that seams 64, 65 can be inductively welded without substantially heating the mandrel.

Figure 9:
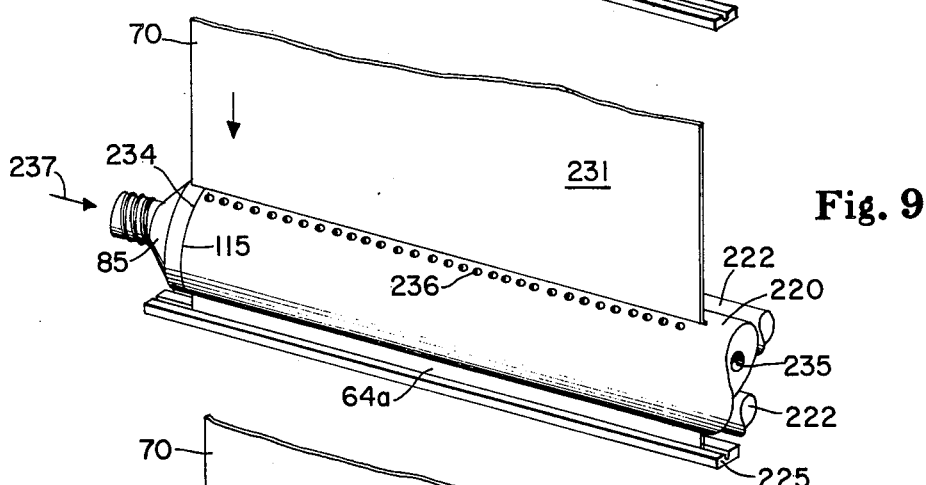

The conversion of a sheet 231 of body forming material into a longitudinally partitioned tubular body form is depicted in FIGS. 8 through 11 which are sequential, fragmentary perspective views. To begin such conversion, mandrel 220 is angularly indexed so that the plane of slot 230 has an orthogonal relation with stop 225 as shown in FIG. 8. Stop 225 is secured to and is a part of gauging means 224, FIG. 1. Then, sheet 231 is telescoped through slot 230 until side edge 62 of sheet 231 abuts stop 225, FIG. 9. Stop 225 is spaced from mandrel 220 so that a longitudinally extending seam forming portion 64a of sheet 231 adjacent edge 62 extends from the underside of mandrel 220 as shown in FIG. 9. Then, if a head fitment 85 is to be assembled to the tubular body 50 which is being made, head fitment 85 is moved longitudinally with respect to the axis of mandrel 220 which direction is indicated by numeral 237, FIG. 9. The movement of head fitment 85 telescopes cylindrical skirt 88 of head fitment 85 over the cylindrical portion 233 of mandrel 220 until the bottom edge 115 of skirt 88 abuts shoulder 234 of mandrel 220, and the adjacent edge portion of sheet 231 which is disposed in slot 230 is received in diametral channel 89 of head fitment 85. Alternatively, if tubular bodies are to be made without having head fitments secured thereto, the operations described above with respect to the head fitment are omitted.

Figure 10:
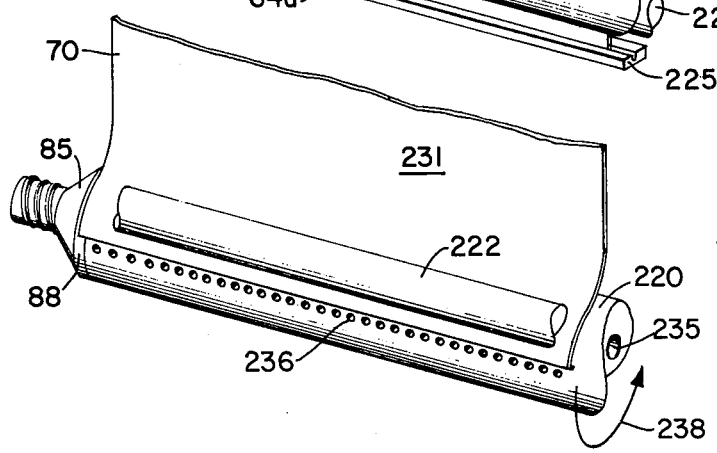
Figure 11:
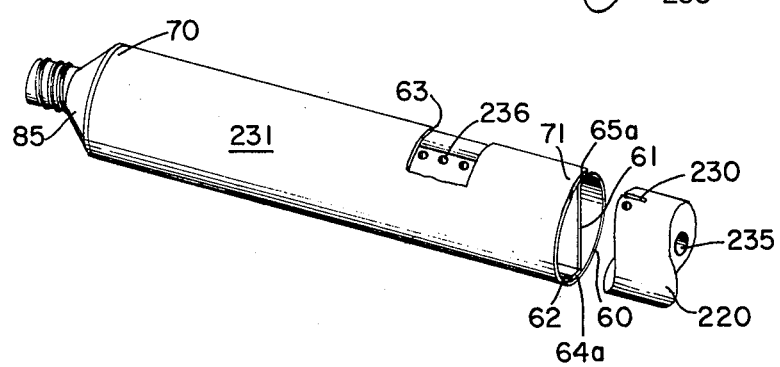

Upon biasing idler rolls 222 against mandrel 220, and rotating mandrel 220 in the direction indicated by arrow 238, FIG. 10, sheet 231 is spindled tightly about mandrel 220 and the cylindrical skirt 88 of head fitment 85 so that sheet 231 is converted into a tubular exterior wall 60 and an integral diametral or chordal partition 61, FIG. 11.

The width of sheet 231 intermediate edges 62 and 63 is of sufficient size with respect to the diameter of mandrel 220 that the tubular wall 60 comprises two circumferentially overlapped, longitudinally extending seam forming portions 64a, 65a, FIG. 1, one of which is disposed adjacent each of the longitudinally extendng side edges 62, 63 of partition 61. Referring back to FIG. 1, control means 205 provides means for controlling means 221 for angularly indexing and rotating mandrel 220 so that mandrel 220 is rotated to spindle sheet 231 as indicated in FIGS. 10 and 11, and rotation of mandrel 220 is stopped at a predetermined angular position the purpose of which will be explained later.

After spindling sheet 231 to provide the configuration shown in FIG. 11, vacuum is applied from vacuum means 206, FIG. 1, through passageways 235, 236, FIG. 11, to retain sheet 231 in the spindled configuration until the longitudinal seams 64, 65 are welded.

Means 233, FIG. 12, is provided for biasing idler rolls 222 against mandrel 220 during the spindling operation, and for displacing idler rolls 222 away from mandrel 220 after the spindling operation. Means 223 comprises pneumatic acutator 240, two intermediate levers 242, and idler roll supports 243, 244. Pneumatic actuator 240 is disposed intermediate base plate 241 of the frame of apparatus 200, and intermediate levers 242. The intermediate levers 242 are connected between the distal end of the piston rod of actuator 240 and pivotal points on idler roll supports 242, 244, respectively.

Actuator 240 is provided with two pneumatic lines 245, 246. When line 245 is pressurized and line 246 is vented, the piston rod of actuator 240 is extended. Such extension causes the linkage to bias idler rolls 222 against the cylindrical surface of mandrel 220. When line 246 is pressurized and line 245 is vented, the piston rod of actuator 240 is retracted which, through the linkage provided, causes the idler rolls 222 to be displaced away from mandrel 220 for the purpose described below.

The looping and spindling of a sheet 231 of body forming material is also shown sequentially in FIGS. 13 through 17. After the sheet of material is telescoped downwardly through the diametral slot 230 of mandrel 220 as shown in FIG. 12, idler rolls 222 are biased against mandrel 220 as indicated in FIGS. 13 through 17. Then, upon rotation of mandrel 220 with respect to idler rolls 222, the sheet of material 231 is looped and spindled as shown. Vacuum applied through passageways 235, 236 act on the adjacent portion of sheet 231 to retain sheet 231 in the looped and spindled configuration until seam forming areas 64a, 65a, FIG. 17, are welded.

LONGITUDINAL SEAMING MEANS

Longitudinal seaming means 202 is shown in the fragmentary, partially sectioned, side elevational view of FIG. 18. FIG. 18 also includes a fragmentary portion of the mandrel translation means 209.

Longitudinal seaming means 202 comprises a stationary jaw 250 and a movable jaw 251 which is pivoted on pin 252 so that it is movable by actuator 253 between the closed position as drawn in FIG. 18 and the dotted position as shown in FIG. 18. Actuator 253 is provided with two pneumatic lines 254, 255 which, when one is pressurized while the other is vented, cause movable jaw 251 to be positioned at the OPEN and CLOSED positions, respectively.

Jaws 250 and 251 are each provided with a longitudinally extending concave portion for accommodating the longitudinally extending seam areas 64a, 65a sheet 231 which is spindled about mandrel 220. Jaws 250, 251 have longitudinally extending RF conductors 257, 258 respectively embedded in them so that they are in close proximity to the longitudinally extending seam forming areas of tubular body form disposed on mandrel 220 when mandrel 220 is properly indexed as shown in FIG. 18 and when movable jaw 251 is biased to its CLOSED position by actuator 253.

Additional RF conductors 259, 260, and plug 261 and socket 262 are provided to electrically connect conductors 257, 258 in series when jaw 251 is at its closed position. Thus, referring to FIG. 1, RF energy can be applied to conductors 257, 258 simultaneously from one RF output of RF energy means 208 by means not shown for connecting output lead 263 to lead 257 and for connecting output lead 264 to lead 258, or vice versa. Then, upon being triggered by control means 205, a predetermined level and frequency of RF energy is applied to conductors 257, 258 for a predetermined period of time from RF energy means 208 to inductively heat seal or weld longitudinally extending seams 64, 65 of tubular body 50, FIG. 18.

MANDREL TRANSLATION MEANS

Referring still to FIG. 18, fragmentary portions of mandrel translation means 209 are shown to include mandrel support lever 270 which is pivoted about pin 271, and an actuator 272 having one end pivotally attached to clevis 273 which is secured to frame 274 of apparatus 200. The distal end of the actuator rod is pivotally connected to mandrel support lever 270 by pivot pin 275. When extended, actuator 272 positions the mandrel at the position shown by solid lines in FIG. 18 at which position the longitudinally extending seams 64, 65 are sealed. When retracted, actuator 272 positions mandrel 220 in the position shown by the dotted lines in FIG. 18 at which position the mandrel is disposed so that idler rollers 222 are circumferentially spaced about it. Arrows 280, 281, FIG. 18, indicate the movement of idler rolls 222 away from mandrel 220 which movement is required before mandrel translation means 209 can move the mandrel, with a sheet 231 spindled about it, along the arcuate path indicated by arrow 282 from the position where sheet 231 is spindled about mandrel 220 to the position where longitudinally extending seams 64, 65 are welded.

CIRCUMFERENTIAL SEAMING MEANS

Circumferential seaming means 203, FIG. 1, comprises inductor assembly 290, frame mounted guide block 291, alignment pins 292, 293, and actuator 294. To weld circumferential seam 86, reference FIGS. 3, 6 and 7, to secure head fitment 85 to tubular body 50, actuator 294 is extended to telescope the distal end of inductor assembly 290 over head fitment 85, FIG. 19. Then, seam 86 is welded by applying RF energy from RF energy means 208 (via suitable connections not shown in FIG. 1) across leads 295, 296 of inductor assembly 290. As shown in FIG. 19 which is a fragmentary longitudinal sectional view of inductor assembly 290, a substantially torroidal shape conductor 297 is disposed therein so that it is adjacent the shoulder seam area of a container assembly 83 telescoped thereinto. Leads 295, 296 are, of course, in series with conductor 297. After the circumferential seam 86 is welded, inductor assembly 290 is retracted by actuator 294. Then the longitudinally and circumferentially welded container assembly 83 is removed from mandrel 220 by moving it longitudinally with respect to the mandrel. The removal of container 84 from mandrel 220 may be pneumatically assisted by applying pressurized gas to passageway 235 from compressed gas means 207, FIG. 1.

An inductor for making such a circumferential seam such as seam 86 is disclosed in U.S. Pat. No. 3,727,022, issued Apr. 10, 1973 to Peter W. Hamilton.

CHORDAL SEAM WELDING MEANS

Briefly, after removing a partially welded container assembly 83 from mandrel 220, the container assembly is telescoped over a bifurcated, chordal seam inductor 300, FIG. 1, and is clamped onto the inductor by clamping means 401, FIGS. 1 and 27. Then, upon applying RF energy from RF energy means 208 to inductor 300, the diametral or chordal seam 96, FIG. 6, is welded.

Figure 20:
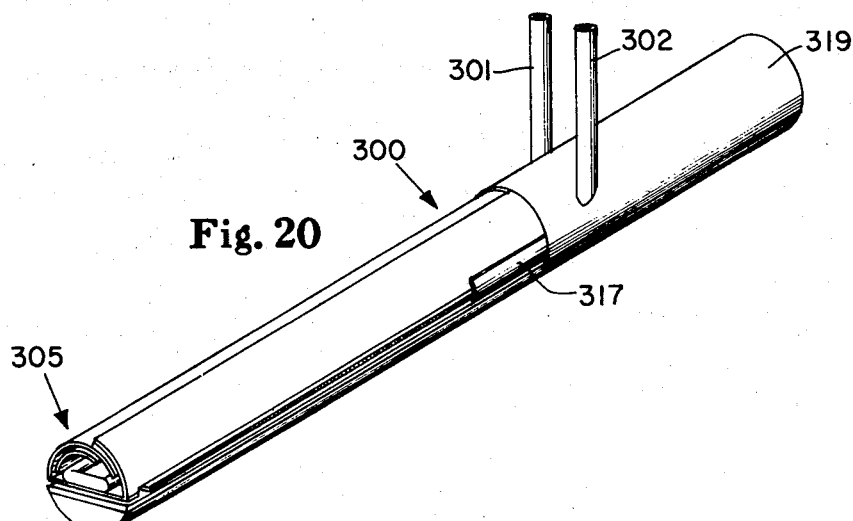
FIG. 20 is a fragmentary perspective view of a bifurcated inductor for induction heat welding the diametral or chordal seam shown in FIG. 6 which seam is disposed between the chordal top edge portion of the partition of the tubular body of FIG. 2 and a chordal bottom edge portion of the divider of the head fitment of FIGS. 4 and 5.
Figure 21:
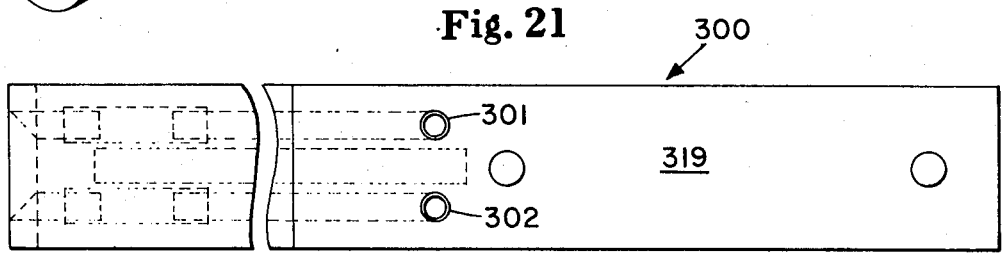
FIG. 21 is a fragmentary top view of the chordal seam inductor of FIG. 20.
Figure 22:
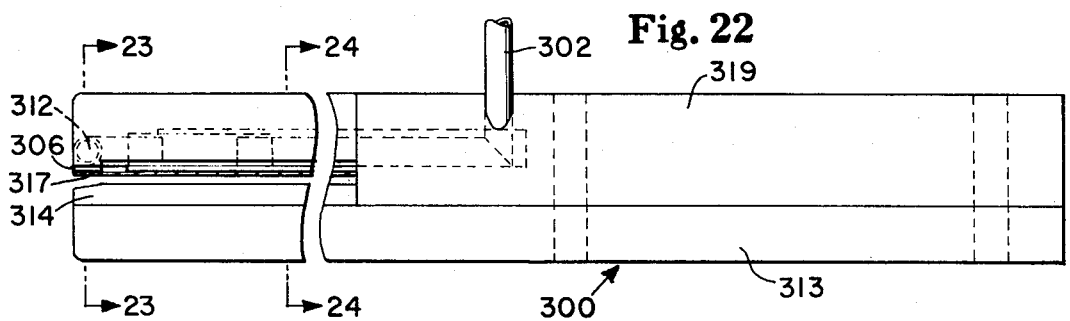
FIG. 22 is a fragmentary side elevational view of the chordal seam inductor of FIG. 20.
Figure 23:
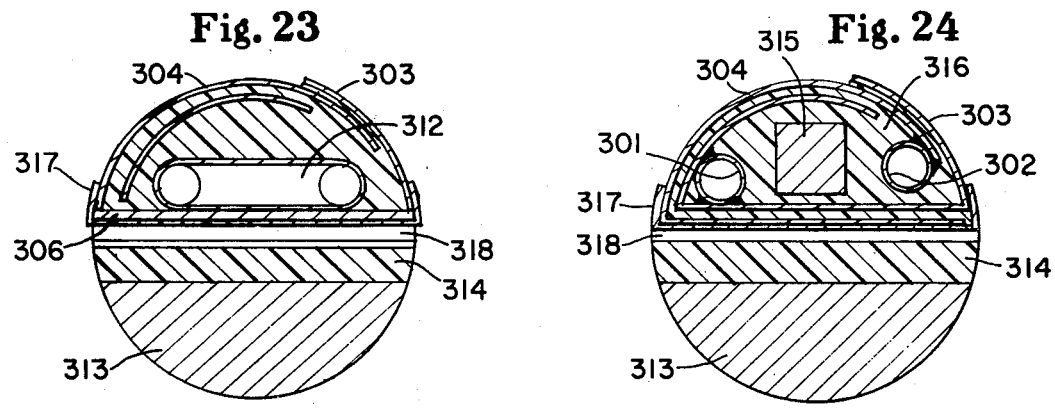
FIGS. 23 and 24 are transverse sectional views of the chordal seam inductor of FIG. 22 taken along lines 23—23 and 24—24, respectively, thereof.
Figure 24:
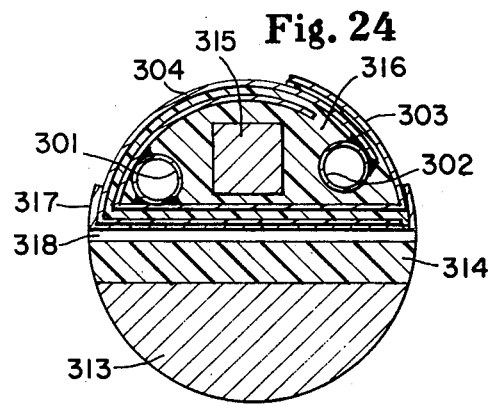

Chordal seam inductor 300, FIGS. 20–26 inclusive, comprises tubular conductors 301, 302, longitudinally extending sheet-type conductors 303, 304, diametral conductor 306, tubular couplings 310, 311, coolant tube 312, body portions 313 and 319, chordal insulator 314, and spine 315. Spine 315 provides structural integrity for the top bifurcation of the assembly as shown in FIGS. 20, 23 and 24. The spaces between conductors 303, 304 is filled with insulation material 316 such as epoxy resin to maintain them in their indicated spatial relations. Also, a sheet 317 of insulation material such as teflon impregnated glass cloth is provided, because of its insulation and release properties, to space the chordal portions of conductors 304, FIG. 25, and conductor 306, FIG. 23, from a tubular body partition disposed in the slot 318 of inductor 300.

For inductor 300 to weld a diametral or chordal seam 96 of a container assembly 83 having a tubular body 60 formed from a sheet 231 of material comprising a conductive or RF heating susceptible material, without overheating the other portions of partition 61 and the tubular exterior wall 60 of the tubular body, conductors 303 and 304 are very wide compared to the width of diametral conductor 306, and conductors 303, 304 are in close proximity with each other. This geometry is required so that current densities through conductors 303, 304 are substantially less than the current density through diametral conductor 306, and so that the electric fields induced by conductors 303, 304 substantially cancel each other. Non-conductive tubular couplings 310, 311 are disposed intermediate coolant tube 312 and tubular conductors 301, 302 respectively to provide electrical isolation and to provide means for circulating coolant fluid through the inductor assembly to prevent it from overheating.

In operation, RF energy is applied to inductor 300 through tubular conductors 301, 302. Then, RF energy is conducted by the relatively wide and thin, longitudinally extending, arcuate shaped, mechanically interlocked sheet-type conductors 303, 304 to the distal end 305 of inductor 300. The mechanically interlocked conductors 303, 304 and their brazed or welded connections to tubular conductors 301, 302, respectively, are shown most clearly in the exploded, fragmentary view of FIG. 25, and in the assembled, fragmentary view of FIG. 26. Both FIGS. 25, 26 are in enlarged scale for clarity. At the distal end 305 of inductor 300, the RF energy is conducted diametrically by diametral conductor 306, FIGS. 25, 26, which is series connected intermediate the ends of conductors 303, 304.

Inductor 300 is bifurcated by slot 318 so that a partially welded container assembly 83, FIG. 3, can be telescoped onto it as shown in FIG. 27 so that diametral conductor 306 is disposed adjacent wall 90 or 91, FIG. 6, of divider 92 of head fitment 85. The elements of inductor 300 are so configured with respect to the configuration of divider 92 of head fitment 85 and channel 89 that the top edge portion 70 of partition 61 of tubular body 50 is squeezed between wall portions 90, 91 upon clamping a partially welded container assembly 83 on inductor assembly 300 as indicated in FIG. 27. Then, upon application of RF energy of a predetermined frequency, power level, and duration, RF energy flow through diametral conductor 306 will internally heat the inner lamina sheet 231 to effect welding diametral or chordal seam 96, FIG. 6.

RF ENERGY MEANS

RF energy means 208, hereinafter referred to as RF means, FIG. 1, comprises two output cycle timers 268, 269, RF output leads 263 through 266, power level control means (not indicated in the figures), and means responsive to control means 205 of apparatus 200 for initiating cycles of predetermined length of timers 268, 269. Timer 268 applies a predetermined level of RF output to leads 263, 264 for a predetermined period of time per cycle, and timer 269 similarly applies power to leads 265, 266.

A suitable RF means 208, FIG. 1, is the Radio Frequency Company's Model 7500 High Frequency Generator, having a maximum output of 7500 watts at 450 KHZ.

In the preferred embodiment apparatus 200, FIG. 1, means are provided for controlling the longitudinal seam welding means 202 by cycle timer 268. Means not shown in the figures are provided for connecting and energizing the circumferential seam welding means 203 in parallel with the chordal seam welding means 204 and controlling their heating cycles by cycle timer 269.

CONTROL MEANS

Control means 205 is provided to enable an operator to control the operations and functions of apparatus 200 as hereinbefore described in detail.

Although apparatus 200 has been described in conjunction with a head fitment 85, FIGS. 4, 5, having a downwardly opening chordal channel 89 disposed in the lower portion of divider 92, it is not intended to thereby limit the present invention. In fact, the present invention provides means suitable for sealingly securing the alternate (unchanneled) head fitment shown in FIGS. 22, 23 of the hereinbefore referenced copending application of Charles R. Hood and Stephen F. Evans entitled COLLAPSIBLE LONGITUDINALLY PARTITIONED TUBULAR DISPENSING CONTAINER to the alternate tubular body 50b, FIG. 13, of that application to form alternate container 84a, FIG. 24, of that application, which figures and the corresponding text portions of that application are hereby incorporated by reference.

Uses for tubular bodies 50, FIG. 2, are illustrated in FIGS. 38, 39. Packages 105 and 106 are formed by collapsing and sealing the ends of tubular bodies 50 as indicated in FIGS. 35 through 37 inclusive. A use of the container assembly 83, FIG. 3, is illustrated by container 84, FIG. 34. Container 34 comprises container assembly 83 which has its bottom end collapsed and sealed to form seam 87, FIG. 34.

Container 84, FIG. 34, and packages 105, 106, FIGS. 38, 39, respectively, can be used for separately storing and co-dispensing the components of two-component products.

While a preferred apparatus embodiment of the present invention has been illustrated and described, it will be obvious to those skilled in the art that various changes and modifications can be made without departing from the spirit and scope of the invention. In particular, such mandrel and inductor modifications as are required to enable making the alternate tubular body configurations of FIGS. 29 through 31, inclusive, are considered within the scope of the present invention and, without further explanation, it is believed that such modifications are obvious to persons having ordinary skill in the art. It is intended to cover, therefore, in the appended claims, all changes and modifications that are within the scope of this invention.

What is claimed is:

1. An induction heating chordal seam inductor for welding a chordal portion of a chrodal partition of a longitudinally partitioned tubular body comprising RF susceptor material to an adjacent chordal portion of a chordal divider of a longitudinally divided head fitment comprising thermoplastic material which head fitment is fitted to and substantially closes one end of said tubular body, said inductor having a cylindrical body configuration which is bifurcated by a chordal slot so that the inductor can be telescoped into the end of the tubular body disposed opposite from the end to which the head fitment is fitted, said partition being received in said slot during said telescoping, one bifurcation of said inductor comprising two longitudinally extending conductors which are series connected to the opposite ends of a chordal conductor disposed at the distal end of said one bifurcation so that said chordal conductor faces said slot, said longitudinally extending conductors being configured to provide low current densities therethrough relative to the current density in said chordal conductor for any given current flow through the series circuit, said longitudinally extending conductors also being configured and disposed in close overlapping proximity to each other so that fields induced by oppositely flowing currents therethrough substantially cancel each other, said inductor also comprising means for pressing said chordal portions together and juxtapositioning said chordal conductor adjacent thereto whereby an electromagnetic field can be induced by said chordal conductor to weld said chordal seam by inducing heat in said RF susceptor material of said tubular body without substantially heating the other portions of the body and head fitment.

* * * * *